United States Patent Office 3,394,726
Patented July 30, 1968

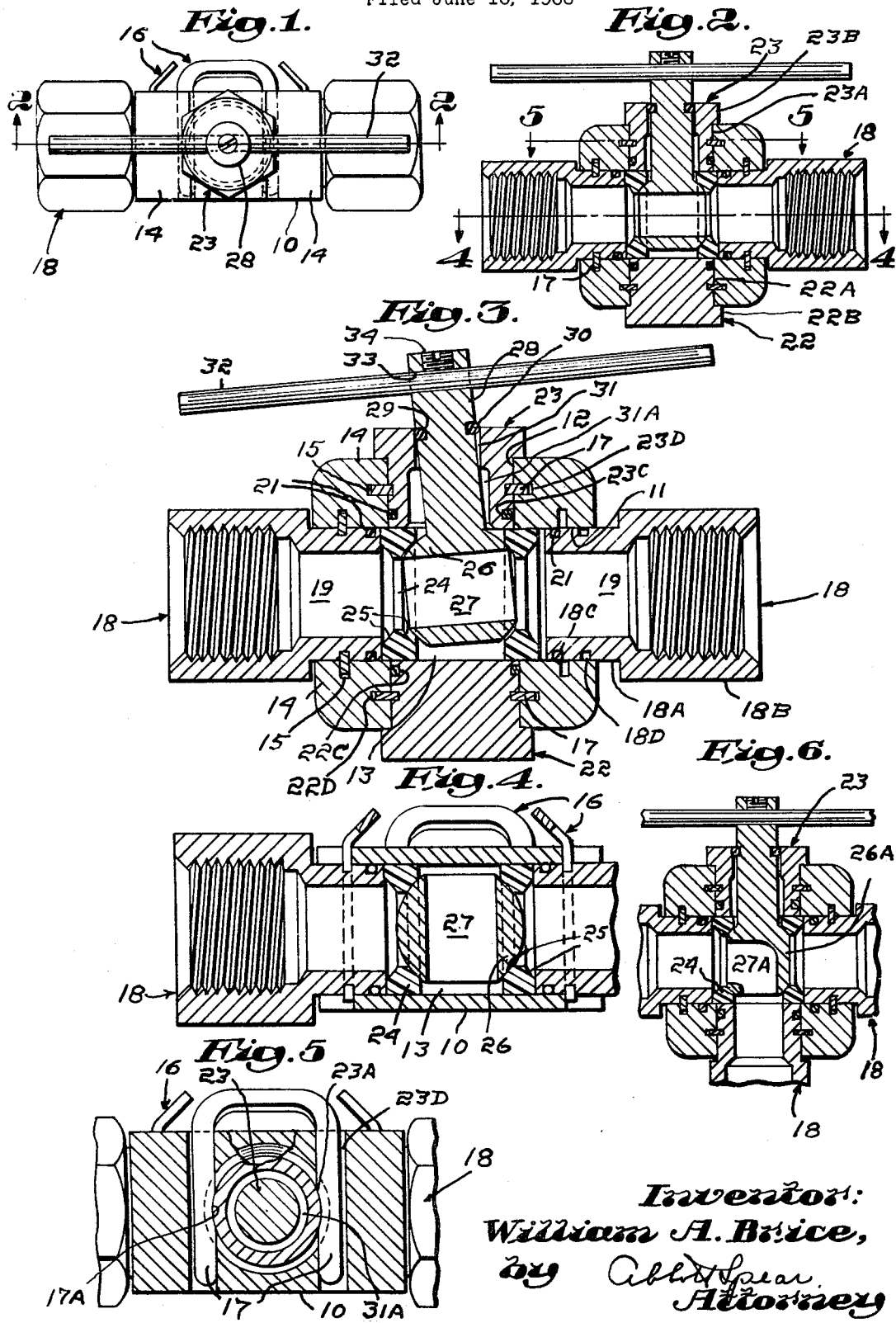

3,394,726
VALVE
William A. Brice, South Portland, Maine, assignor, by mesne assignments, to Ametek, Inc., New York, N.Y., a corporation of Delaware
Filed June 16, 1966, Ser. No. 557,964
12 Claims. (Cl. 137—269)

ABSTRACT OF THE DISCLOSURE

Valve having a chamber formed by intersecting bores with ring seals slidable in two bores and dimensioned to protrude into the chamber, when engaged by and positioned by conduit members attached thereto, to be compressed by engagement of the valve member, the bores extending through the body and being of the same diameter and the attaching means for the conduit members, plug, and the member receiving the stem of the valve member permitting quick detachability and interchangeability.

---

The present invention relates to valves and particularly to a valve construction in which the body has intersecting bores and inserts are sealed in the bores and attached to the body to complete the valve.

In the usual valve construction, the valve body is formed with seats and fluid passages, and the valve is completed by a valve member attached to the body to control the passages in a particular manner. While valves so made are widely used, there is a need for a simpler construction that will enable the same valve body construction to be used in different valves and the valves adapted to a wide range of use or installation requirements and the principal objective of the invention is to provide valves meeting that need.

In accordance with the invention, that generally stated objective is met by providing a body having cylindrical bores in each end and an intermediate cylindrical bore which forms a chamber into which the end bores open. Ring seals, one for each end bore, are dimensioned to be a slidable fit therein and these are of such axial extent that each may have an operative position supported in an end bore and protruding into the valve chamber. A conduit insert is sealed in each end bore and detachably attached to the body and when thus attached, it places and backs the seal in that end bore in its operative position. A ported valve member is a free fit within the chamber but is engaged by and compresses the ring seals when both are brought into their operative position. The valve member has its stem extending freely through but sealed in an axial bore in an insert sealed in the intermediate bore and detachably attached to the body, the axial bore being dimensioned to enable the stem to swing thus to permit the valve member to move lengthwise of the chamber as the ring seals are brought into their operative position by the attachment of the conduit inserts to the valve body.

Another objective of the present invention is to have the intermediate bore extend through the body so that the same body may be used, for example, as a shut-off valve with a plug insert in one end of the intermediate bore and as a two way valve with a different valve member and a third conduit insert used in place of the plug insert.

In the accompanying drawings, there are shown illustrative embodiments of the invention from which these and other of its objectives, novel features, and advantages will be apparent.

In the drawings:

FIGURE 1 is a top elevation of a valve in accordance with the invention,

FIGURE 2 is a section taken approximately along the indicated lines 2—2 of FIGURE 1, FIGURE 3 is a like view but on an increased scale and illustrating the assembly of the valve, FIGURES 4 and 5 are fragmentary sections taken approximately along the indicated lines 4—4 and 5—5, respectively, of FIGURE 2, and FIGURE 6 is a fragmentary view similar to FIGURE 2 but illustrating another embodiment of the invention.

In the embodiment of the invention illustrated by FIGURES 1–5, a valve body 10 has a bore 11 extending centrally from end-to-end thereof and a bore 12 of the same diameter extending centrally from top-to-bottom thereof. The bores 11 and 12, shown as intersecting at right angles, form a chamber 13 at their intersection. As the body 10 is square in the plane of the bores 11 and 12, the bores are both divided into end sections of equal length. Each bore end section opens outwardly between parallel ribs 14 each having an undercut slot 15 to slidably receive retainers generally indicated at 16. Each retainer 16 is shown as U-shaped and of resilient stock with its arms 17 of sufficient width to protrude into positions partially blocking the bore end section when extending lengthwise of and held by the appropriate guide slots 15. The proximate edges of the arms 17 have, as may be seen in FIGURE 5, recesses 17A.

Each bore end section is provided with an insert and while the inserts have or may have different functions or other features, they are all constructed to be sealed in a bore end section and attached to the body 10 in the same manner. Each of the generally indicated inserts 18 has a passage 19 extending therethrough and hence is a conduit, a cylindrical portion 18A, and an end portion 18B, shown as in the form of a nut and interiorly threaded as at 20. The cylindrical portion 18A has, adjacent its free end, an annular groove 18C for a seal such as an O-ring seal 21 and, adjacent its end portion 18B, an annular groove 18D which registers with the slots 15 of a pair of ribs 14 when the insert has been advanced in a bore end section to a predetermined extent. A retainer 16 may then be slid lengthwise of the rib slots 15 until the recesses 17A of its arms engage the periphery of the cylindrical portion 18A within the groove 18D thus to detachably connect that insert to the body 10 with the seal 21 preventing leakage along its exterior and to provide a detent connection between each insert and its retainer. For this reason, the slots 15 are dimensioned to permit slight spreading of the retainer arms 17.

The inserts 22 and 23 have corresponding parts for sealing them in bore end sections and attaching them to the body 10 and these are identified by the corresponding suffix additions to the reference numerals for those inserts. The insert 22 is a plug and is necessary inasmuch as the bore 12 extends through the body 10 as is desirable in order that a body of the same construction may also be used as a conduit connector or in other valve embodiments such as that shown in FIGURE 6.

In accordance with the invention, ring seals 24 are provided, one for each end section of the bore 11 and a slidable fit therein. Each ring seal 24 is of such axial extent that, in its operative position in which it is backed by an anchored insert 18, it protrudes into the chamber 13. It will be noted that each face of the seals 24 has a concavity 25 appropriate for sealing engagement with the valve member 26.

The valve member 26 has a diametrical port 27 and is shown as of the ball type and as having an integral stem 28 provided with an annular groove 29 holding a seal 30 of the O-ring type. The valve member 26 is a free fit within the chamber 13 when the seals 24 are not in place and the insert 23 has an axial bore 31 freely receiving the stem 28 and opening into a counterbore 31A. When the valve member 26 is in engagement with both seals 24, they are compressed to ensure against leakage and the stem seal 30 is close to the upper end of the bore 31. The stem 28 is slidable in the bore 31 until the valve member 26 comes into engagement with the inner end of the insert 23 but such movement is sufficient to expose the seal 30 should it need replacement. The handle 32 is shown as a rod extending through a transverse bore 33 in the stem 28 and secured in place as by a set screw 34.

It will be apparent that the valve stem 28 is free to swing due to the dimensions of the bore 31 and the counterbore 31A and to the fact that the seal 30 is the only contact between the stem 28 and the bore 31. Such permissible movement of the stem 28 permits the valve member 26 to move lengthwise of the chamber 13. When the valve is assembled, the valve member 26 may be placed in the chamber 13 at any time before the seals 24 are operatively positioned. As will be apparent from FIGURE 3, when one insert 18 is sealed in an end section and secured to the valve body 10, a seal 24 is forced into its operative position and the valve member is displaced towards the other end section of the bore 11. When the other insert 18 is thus sealed in the last named bore end section and secured to the body 10, the seal 24 in that end section is forced into its operative position and the valve member 26 becomes centered with the seals 24 partly compressed against the backing or proximate ends of the inserts 18. In the FIGURE 2 and 3 position, the port 27 of the valve member 26 effects communication between the inserts 18 and when the handle 32 is turned at right angles to its position shown in the drawings, flow through the valve is shut off.

In FIGURE 6, there is shown another valve in accordance with the invention utilizing the same parts with two exceptions. The valve member 26A has its port 27A, in the form of an elbow and another conduit insert, another insert 18, for example, replaces the plug insert 22 thereby to provide, as the stem is turned through 180°, a first position in which one of the conduit inserts 18 in the end sections of the bore 11 is placed in communication with the conduit insert 18 in the lower end section of the bore 12, a second position in which the conduit insert 18 in the other end section of the bore 11 is in communication therewith, and an intermediate shut-off position.

From the foregoing, it will be appreciated that valves in accordance with the invention are adapted to be economically manufactured, easily and quickly assembled for use, capable of meeting a wide range of installation requirements, and easily serviced or converted to another type of valve if such service or conversion becomes necessary.

I claim:
1. In a valve, a body having a cylindrical bore of the same diameter in each end, and an intermediate bore angular with respect to said end bores and forming a chamber into which both of said end bores open, a pair of ring seals slidable in said end bores, one for each end bore and of sufficient axial extent to have an operative position supported thereby and protruding into said chamber, a pair of conduit inserts, one for each end bore and sealed therein and detachably connected to said body by single position detent connections and, when thus connected, engaging and placing the appropriate ring seal in its operative position, a valve member in said chamber having a port and including an integral stem, said valve member being a free fit in said chamber but engaged by and compressing said ring seals when both are in their operative positions, and an insert sealed in said intermediate bore and detachably connected to said body, said last named insert having an axial bore through which said stem freely extends, and a ring seal between said stem and said last named insert, said axial bore being dimensioned to enable said stem to swing to permit said valve member to move lengthwise of said chamber as said ring seals for the end bores are brought into their operative positions by the attachment of said conduit inserts to said body, said stem being free to swing.

2. The valve of claim 1 in which a fourth bore opens into the chamber, a conduit is secured in the fourth bore and sealed to the body, and the port in the valve member defines any angle such as to place the conduit in the fourth bore in communication with either of the end bores when the valve member is appropriately turned.

3. The valve of claim 1 in which the intermediate bore extends through the body and is divided by the chamber into first and second end portions, and the two bores are of the same diameter, the insert for the valve stem is in the first end portion of the second bore, and an insert is sealed in the second end portion thereof and detachably connected to the body.

4. The valve of claim 3 in which the insert in the second end portion of the second bore is a plug.

5. The valve of claim 3 in which the valve member port is angular, the angle being such that the second end portion of the intermediate bore may be placed in communication with either conduit section by the appropriate rotation of the valve member.

6. The valve of claim 5 in which the insert in the second end portion of the second bore is a conduit insert.

7. The valve of claim 3 in which the body is square in the plane of the axis of the bores and all of the end portions are of the same length and of the same diameter.

8. The valve of claim 3 in which all of the inserts are slidable in the end portions and each carries a ring seal.

9. The valve of claim 1 in which each ring seal engageable with the valve member has an annular concavity in each face thereby to be reversible.

10. The valve of claim 1 in which the ring seal between the stem and the stem-receiving insert is adjacent the outer end of that insert and the bore of the stem receiving insert has a counter bore opening into the chamber.

11. The valve of claim 10 in which the ring seal between the stem and the stem-receiving insert is carried by the stem in a position to be close to the outer end of the stem-receiving insert when the valve member is in engagement with the ring seals therefor.

12. The valve of claim 10 in which outward sliding movement of the stem relative to the stem-receiving insert is limited by the engagement of the valve member with the inner end thereof, the sealing ring on the stem then being fully exposed.

References Cited
UNITED STATES PATENTS

| | | | |
|---|---|---|---|
| 2,839,266 | 6/1958 | Kaiser | 251—315 XR |
| 2,855,177 | 10/1958 | Freeman | 251—315 XR |
| 2,945,666 | 7/1960 | Freeman et al. | 251—315 XR |
| 1,553,299 | 9/1925 | Adams | 137—270 X |
| 2,995,336 | 8/1961 | Usab | 251—315 X |
| 3,118,649 | 1/1964 | Allen et al. | 251—315 X |
| 3,165,292 | 1/1965 | Dumm | 251—317 X |

M. CARY NELSON, *Primary Examiner.*

R. J. MILLER, *Assistant Examiner.*